(12) United States Patent  
McCauley et al.

(10) Patent No.: US 6,991,276 B2  
(45) Date of Patent: Jan. 31, 2006

(54) LUGGAGE LOFT ASSEMBLY

(76) Inventors: Alvin D. McCauley, 11154 Horton, Holly, MI (US) 48442; David B. Gronzo, 9538 Bart Ave., Davisburg, MI (US) 48350

( * ) Notice: Subject to any disclaimer, the term of this patent is extended or adjusted under 35 U.S.C. 154(b) by 26 days.

(21) Appl. No.: 10/850,534

(22) Filed: May 20, 2004

(65) Prior Publication Data

US 2005/0001441 A1    Jan. 6, 2005

Related U.S. Application Data

(60) Provisional application No. 60/471,925, filed on May 20, 2003.

(51) Int. Cl.  
*B60N 3/12*    (2006.01)

(52) U.S. Cl. .................... 296/37.7; 296/37.8; 296/208; 105/325

(58) Field of Classification Search ............... 296/37.7, 296/37.8, 208; 105/325  
See application file for complete search history.

(56) References Cited

U.S. PATENT DOCUMENTS

| | | | | |
|---|---|---|---|---|
| 4,368,937 A | * | 1/1983 | Palombo et al. ........... | 296/37.7 |
| 5,441,326 A | * | 8/1995 | Mikalonis .................. | 296/37.7 |
| 5,466,028 A | * | 11/1995 | Nicopolis .................. | 296/37.7 |
| 5,775,761 A | * | 7/1998 | Asami et al. ............... | 296/37.7 |
| 6,241,186 B1 | | 6/2001 | Calnon | |
| 6,485,078 B1 | * | 11/2002 | Lim .......................... | 296/37.7 |
| 6,527,325 B2 | * | 3/2003 | Steingrebe et al. ........ | 296/37.7 |
| 6,883,753 B1 | * | 4/2005 | Scown ..................... | 244/118.1 |
| 6,908,136 B2 | * | 6/2005 | Bohm et al. ............... | 296/37.7 |
| 2002/0030374 A1 | * | 3/2002 | Myburgh ................... | 296/37.7 |
| 2002/0101090 A1 | * | 8/2002 | Steingrebe et al. ........ | 296/37.8 |

* cited by examiner

*Primary Examiner*—Lori L. Coletta  
(74) *Attorney, Agent, or Firm*—Reising, Ethington, Barnes, Kisselle, P.C.

(57) ABSTRACT

A luggage loft assembly for supporting articles for overhead storage in a mass transit vehicle includes an inner shell having a shelf panel and a back wall that extends upward from an outboard edge of the shelf panel and connects at an upper edge to the ceiling of a vehicle passenger compartment. An outer shell has an inboard edge connected to an inboard edge of the inner shell and an outboard edge connectable to a supporting structure such as a vehicle passenger compartment wall. The outer shell partially defines a longitudinal cavity between the outer shell, the wall, and the ceiling of the vehicle passenger compartment. Stanchions connect at respective lower ends to the inboard edge of one of the inner and outer shells. The stanchions have upper ends connectable to a supporting structure such as the ceiling of a vehicle passenger compartment. The outer shell comprises inboard and outboard channels that interconnect with each other and with the inner shell.

33 Claims, 7 Drawing Sheets

LUGGAGE LOFT ASSEMBLY

CROSS-REFERENCES TO RELATED APPLICATIONS

This application claims the benifit of Provisional Application No. 60/471,925, filed May 20, 2003.

STATEMENT REGARDING FEDERALLY SPONSORED RESEARCH OR DEVELOPMENT

Not Applicable

BACKGROUND OF THE INVENTION

1. Field of the Invention

This invention relates generally to a luggage loft assembly for supporting articles for overhead storage in a mass transit vehicle.

2. Description of the Related Art Including Information Disclosed Under 37 CFR 1.97 AND 1.98

Luggage loft assemblies for supporting articles for overhead storage in a mass transit vehicle are known in the art. Such assemblies generally include a horizontal shelf panel for supporting articles and vertically oriented pillars or stanchions connected along and between an inboard edge of the shelf panel and the ceiling of a vehicle passenger compartment to support the shelf panel. Some luggage loft assemblies are also known to include provisions for supporting fluorescent lamps and/or air vents and reading lamps.

Figure 1:
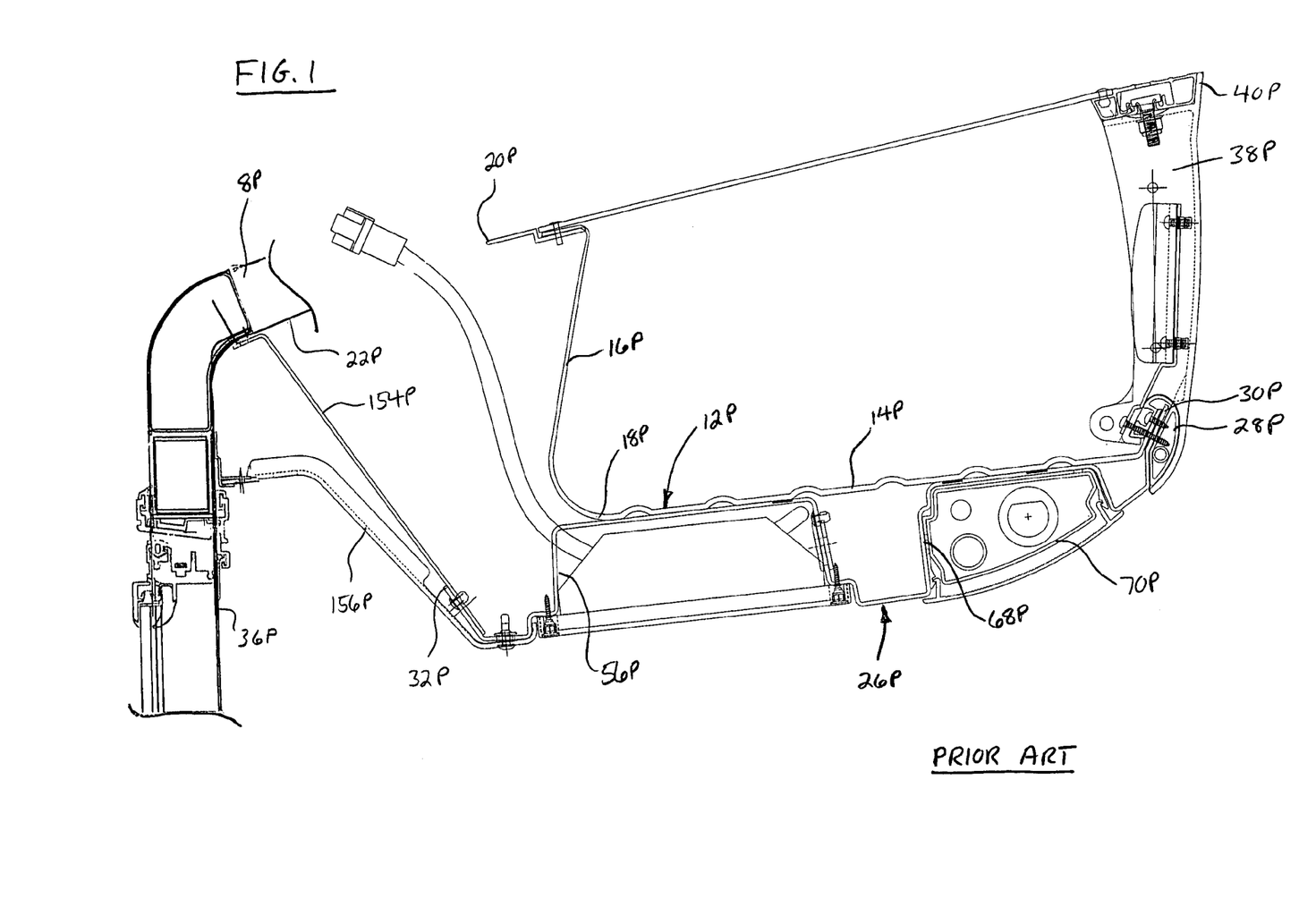
FIG. 1 is a cross sectional end view of a prior art luggage loft assembly.

For example, U.S. Pat. No. 6,241,186 issued 5 Jun. 2001 to Calnon (the Calnon patent) discloses a luggage loft assembly that includes an inner shell and an outer shell. The inner shell includes a generally horizontal integral shelf panel and a back wall that extends integrally upward from an outboard edge of the shelf panel and connects at an upper edge to the ceiling of a vehicle passenger compartment. The back wall supports the outboard edge of the shelf panel by suspending it from the ceiling. The outer shell is spaced below the inner shell forming a cavity between them. An inboard edge of the outer shell is connected to an inboard edge of the inner shell. An outboard edge of the outer shell connects to a wall of a vehicle passenger compartment to support the outboard edge of the outer shell. The cavity formed between the inner and outer shells is also partly defined by a wall and ceiling of the vehicle passenger compartment that the assembly is mounted in. A portion of the cavity is shaped to serve as an air duct or a portion of an air duct that extends longitudinally along the vehicle through several of the assemblies mounted longitudinally end-to-end along the cornice area of the passenger compartment of a mass transit vehicle. The luggage loft assembly of the Calnon patent includes vertically oriented pillars or stanchions each having a lower end connected along the joined inboard edges of the inner and outer shells. Upper ends of the stanchions are connectable to the ceiling of a vehicle passenger compartment to support the respective inboard edges of the inner and outer shells by suspending them from the ceiling. The outer shell is formed to include an elongated longitudinal accessory recess. The accessory recess is shaped to receive accessories such as air vent modules that direct air from the air duct into the passenger compartment and/or reading lamp modules that direct light into the seating area of a passenger compartment. The outer shell is also formed to include an elongated longitudinal lamp recess shaped to form an elongated lamp housing or reflector. The Calnon patent is assigned to the assignee of the present invention, In addition, as shown in FIG. 1, Transmatic Inc. has manufactured a luggage loft assembly similar to the one described above in that it includes an inner shell 12P having shelf panel 14P and a back wall 16P and an outer shell 26P spaced below the inner shell. An inboard edge 28P of the outer shell 26P is connected to an inboard edge 30P of the inner shell 12P and an outboard edge 32P of the outer shell 26P connects to a wall 36P of a vehicle passenger compartment. Also, as disclosed in the Calnon patent, the Transmatic assembly shown in FIG. 1 includes stanchions 38P connected at their lower ends along the joined inboard edges 30P, 32P of the inner and outer shells 12P, 26P and connectable at their upper ends to a compartment ceiling 22P. Also, the outer shell 26P is formed to include an elongated longitudinal accessory recess 56P and an elongated longitudinal lamp recess 68P. However, unlike the assembly disclosed in the Calnon patent, the outer shell 26P of the Transmatic assembly is supported from the vehicle ceiling 22P by straps 154P instead of by being fastened directly to the wall 36P. This arrangement leaves a large gap between the outboard edge 32P of the outer shell 26P and the wall 36P. An installer can use this gap to gain access to the inner shell 12P and to fasten the inner shell 12P to the ceiling 22P during installation. This obviates the need to install prepositioned receiving hardware on the vehicle ceiling. A separate duct panel 156P is fabricated to close the gap between the outboard edge 32P of the outer shell 26P and a vehicle wall 36P and can be fabricated in different configurations as required to suit different vehicle applications. The outer shell 26P is formed to include an elongated longitudinal lighting recess 68P shaped to receive a fluorescent lamp fixture 70P. The inner and outer shells 12P, 26P comprise thermoplastic vac-formed to a uniform thickness of 4 mm, which is the maximum thickness that thermoplastic can presently be vac-formed to while including the requisite detail. However, this luggage loft design requires a large number of rivets and structural reinforcements to provide sufficient structural rigidity, and requires a significant amount of labor to assemble.

What is needed is a luggage loft assembly that requires fewer, easier to fabricate parts, and that is easier, quicker, and less expensive to assemble.

BRIEF SUMMARY OF THE INVENTION

A luggage loft assembly is provided for supporting articles for overhead storage in a mass transit vehicle. The assembly includes an inner shell including:

a shelf panel supportable in a generally horizontal attitude and a longitudinal orientation in a cornice area of a mass transit vehicle, and a back wall that extends integrally upward from an outboard edge of the shelf panel to a back wall upper edge configured to connect to a supporting structure in a vehicle interior;

an outer shell having an inboard edge connected to an inboard edge of the inner shell and having an outboard edge connectable to a supporting structure in a vehicle interior, the outer shell being configured to define a portion of a longitudinal cavity bounded by the outer shell, a wall, and a ceiling of a vehicle;

at least two stanchions, each having a lower end connected to the inboard edge of at least one of the inner and outer shells and each having an upper end connectable to a supporting structure in a vehicle interior; and Unlike the prior art, the outer shell is a composite structure comprising an elongated inboard channel connected to the stanchions and an elongated outboard channel connectable to a supporting structure in a vehicle interior, the inboard channel having an outboard edge connected to an inboard edge of the outboard channel.

If the outer shell were formed as a single part, any defects discovered in any portion of the single-piece outer shell at a subsequent inspection station would require that the entire outer shell be scrapped. With separate channels being formed, the separate channels can be tested and inspected separately before final assembly so that a defect in one channel would result in the scrapping or re-working of only that assembly. Defects can include problems either with the installed modules or with defects in the channels themselves such as miss-drills or surface imperfections.

According to another aspect of the invention each channel is connected to the inner shell.

According to another aspect of the invention the outer shell is configured to define a longitudinally extending air duct in the cornice area of a vehicle interior.

According to another aspect of the invention, at least one of the channels is configured to house an accessory module such as an air vent module that directs air from the air duct into the passenger compartment or a lighting module that directs light into the passenger compartment seating area or a combination air vent and lighting module. If the outer shell were formed as a single part and if, for example, accessory modules including fluorescent light fixtures and vent/reading lamp modules were then installed in the outer shell, any defects discovered in either the fluorescent light fixtures, vent/reading lamp modules, or in any part of the single-piece outer shell at a subsequent final testing and inspection station would result in the scrapping of the entire outer shell assembly. With separate channels being formed to house accessory modules having different components such as fluorescent light fixtures and AC/reading lamp pods, respectively, the separate assemblies can be tested and inspected separately before final assembly so that a defect in one assembly would result in the scrapping or re-working of only that assembly. Defects can include problems either with the installed modules or with defects in the channels themselves such as miss-drills or surface imperfections.

According to another aspect of the invention, the inner and outer shell comprise pultruded glass resin to provide sufficient stiffness to obviate the need for ribs and other supporting structures while reducing shell thickness.

According to another aspect of the invention, the inner and outer shell have generally uniform thicknesses of less than 3 mm to provide sufficiently rigidity.

According to another aspect of the invention, the outer shell includes a longitudinally oriented outboard channel interconnected with the inner shell and a longitudinally oriented inboard channel, and the outboard channel is configured to direct air from the air duct into the passenger compartment.

According to another aspect of the invention, the outboard channel includes an elongated, longitudinally oriented accessory mounting panel recessed into the outer surface of the outboard channel.

According to another aspect of the invention, the outboard channel includes an outboard wall that extends integrally upward from an outboard edge of the mounting panel to an upper edge connected to the inner shell to support the outboard channel from the inner shell.

According to another aspect of the invention, the outboard channel includes at least one alignment pin receiver configured and positioned to receive a pin that aligns longitudinally adjacent channels when the loft assembly is installed end-to-end in series with other such assemblies along the cornice region of a transit vehicle passenger compartment.

According to another aspect of the invention, the assembly includes an integrated wire harness holder comprising a tube configured to receive insulated electrical wires along its interior and having an external size and shape configured to fit within an alignment pin receiver such that the holder can serve double duty as an alignment pin.

According to another aspect of the invention, the outboard channel is pultruded as a single unitary piece from glass resin. Pultruded glass resin parts are more rigid and dimensionally stable than vac-formed thermoplastic parts and therefore require fewer rivets to connect them to each other and to the shelf panel. Vac-formed thermoplastic shells lack stiffness and are easily forced out of shape by, for example, fasteners used to attach them to supporting structures. As such, vac-formed panels require approximately twice as many rivets to smooth out puckers that would otherwise form between fasteners. Also, in manufacture, the configuration of pultruded parts is far more consistent than that of vac-formed parts. Finally, pultruding also allows for the formation of integral tongue and groove interlocks, which makes the parts easier to assemble and provides a means for positively locating parts relative to one another before fasteners are installed.

According to another aspect of the invention, the outer shell includes an inboard channel configured to receive an interior lighting fixture.

According to another aspect of the invention, the inboard channel includes an integrated handrail formed along an inboard upper edge of the channel.

According to another aspect of the invention, the handrail is configured to mechanically interlock with the lower ends of the stanchions.

According to another aspect of the invention, the handrail includes an elongated arcuate detent configured to receive a complementary elongated arcuate groove in the lower end of each stanchion such that each stanchion can be slid onto and along the handrail from one end of the handrail during assembly.

According to another aspect of the invention, the inboard channel includes an inboard interconnect slot formed on an inner surface of the channel adjacent the inboard edge of the channel and configured to receive an inboard edge of the shelf panel.

According to another aspect of the invention, the inboard channel includes an outboard interconnect slot formed in an outboard edge of the channel and configured to receive the inboard edge of the outboard channel.

According to another aspect of the invention, a longitudinal rib extends integrally downward from the shelf panel.

According to another aspect of the invention, the inboard channel is pultruded as a single unitary piece from glass resin.

According to another aspect of the invention, a strap is connected at a lower end to the outboard edge of the outboard channel and is connectable at an upper end to a supporting structure such as a vehicle ceiling and the outboard edge of the outboard channel is spaced from the vehicle wall. This arrangement obviates the need for prepositioned receiving hardware on the vehicle ceiling because an installer can reach between the wall of a vehicle and the outboard edge of the outboard channel to fasten the inner shell to the vehicle ceiling.

According to another aspect of the invention, the outboard edge of the outboard channel is spaced from the vehicle wall and a duct panel is fastened along an inboard duct panel edge to the outboard edge of the outboard channel and is configured to be fastened along an outboard edge to a supporting structure such as a vehicle wall. The duct panel is shaped to close the gap between the outboard edge of the outboard channel and a vehicle wall and can be fabricated in whatever shape is required to suit a particular vehicle application.

According to another aspect of the invention, the upper end of each stanchion is configured to mechanically interlock with a ceiling mount pre-positioned and fastened to the ceiling of a vehicle passenger compartment.

According to another aspect of the invention, the upper end of each stanchion includes an integral elongated male engagement rail having a generally T-shaped cross-section and the ceiling mount comprises an elongated female engagement channel having a T-shaped cross-section and configured to receive the male engagement rail of each stanchion in longitudinal sliding engagement.

The invention also includes a method for making a luggage loft. The method includes interlocking the inner shell with the inboard and outboard channels and fastening them in place, attaching the lower ends of the stanchions along the inboard channel, and attaching the ceiling mount to the upper ends of the stanchions. The method further includes attaching the ceiling mount to a vehicle support structure such as a ceiling after attaching the ceiling mount to the stanchions, and attaching the outboard edge of the outboard channel to a support structure such as a wall of the vehicle.

According to another aspect of the inventive method, the upper edge of the inner shell back wall is then attached to a support structure such as a vehicle ceiling.

According to another aspect of the inventive method, the step of attaching the upper edge of the inner back wall to a support structure includes reaching upward between the vehicle wall and outboard edge of the outboard channel to gain access to the upper edge of the inner shell back wall.

According to another aspect of the inventive method, the step of interlocking the inner shell with the inboard and outboard channels includes inserting the inboard edge of the shelf panel into the inboard interconnect slot of the inboard channel.

According to another aspect of the inventive method, the step of interlocking the inner shell with the inboard and outboard channels includes inserting the inboard edge of the outboard channel into the outboard interconnect slot of the inboard channel.

According to another aspect of the inventive method, the step of attaching the lower ends of the stanchions along the inboard channel includes sliding the stanchions onto one end of the handrail and along the handrail to respective desired spaced-apart positions.

According to another aspect of the inventive method, the step of attaching the ceiling mount to the upper ends of the stanchions includes sliding the engagement channel of the ceiling mount over the engagement rails extending from the upper ends of each of the stanchions.

According to another aspect of the invention, a duct extension panel is installed between the outboard edge of the outboard channel and a wall of a vehicle passenger compartment.

BRIEF DESCRIPTION OF THE SEVERAL VIEWS OF THE DRAWINGS

These and other features and advantages of the invention will become apparent to those skilled in the art in connection with the following detailed description and drawings, in which.

DETAILED DESCRIPTION OF INVENTION EMBODIMENT(S)

Figure 3:
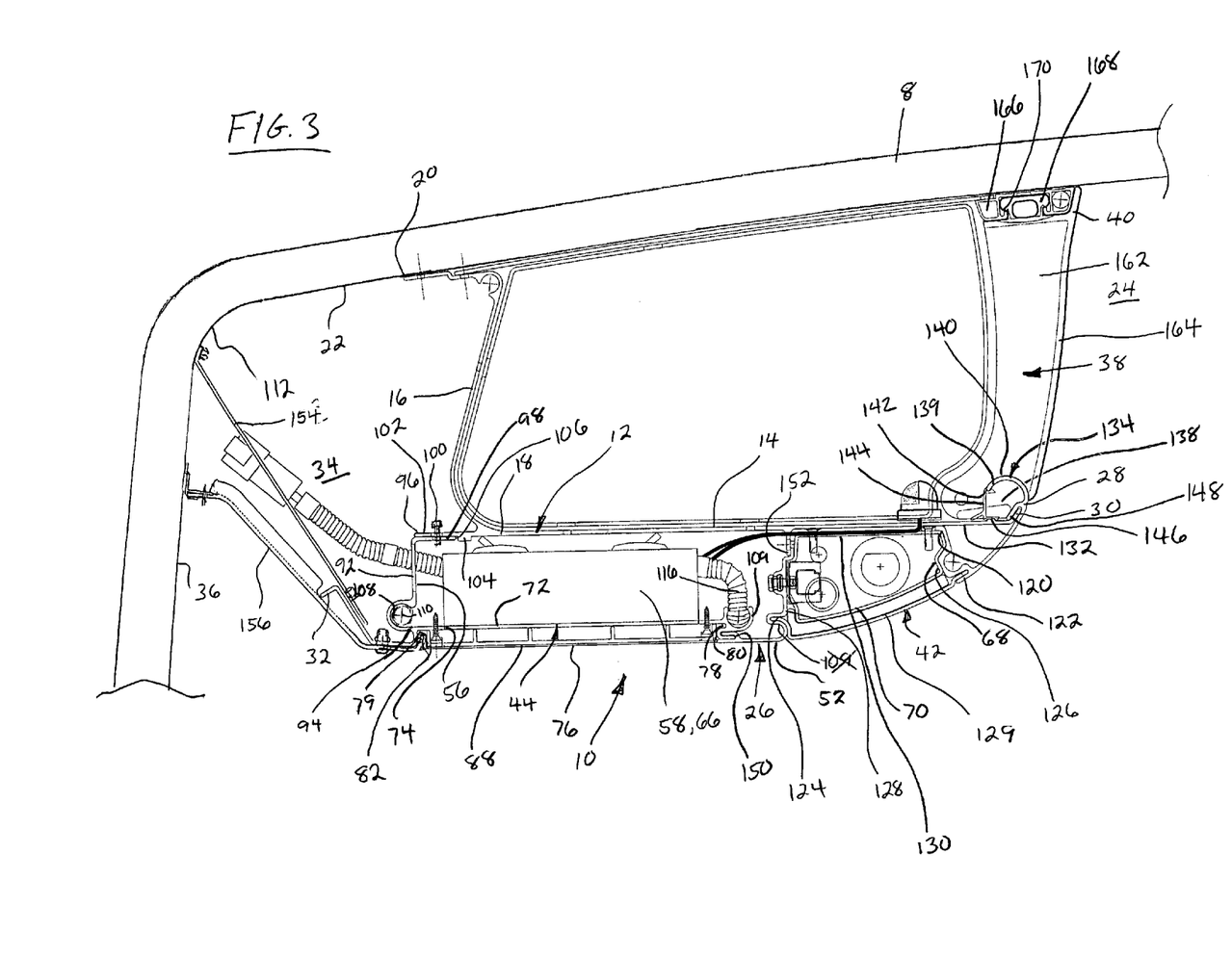
FIG. 3 is a cross sectional end view of the luggage loft assembly of FIG. 2 taken along line 3—3 of FIG. 2.

A luggage loft assembly for supporting articles for overhead storage in a mass transit vehicle 8 is generally shown at 10 in the drawings. As shown in FIG. 3, the assembly 10 includes an inner shell 12 including a generally horizontal integral shelf panel 14 for supporting articles and a generally vertical back wall 16 that extends integrally upward from an outboard edge 18 of the shelf panel 14 and connects at an upper edge 20 to the ceiling 22 of a vehicle passenger compartment 24 to support the outboard edge 18 of the shelf panel 14 by suspending it from the ceiling 22.

Figure 2:
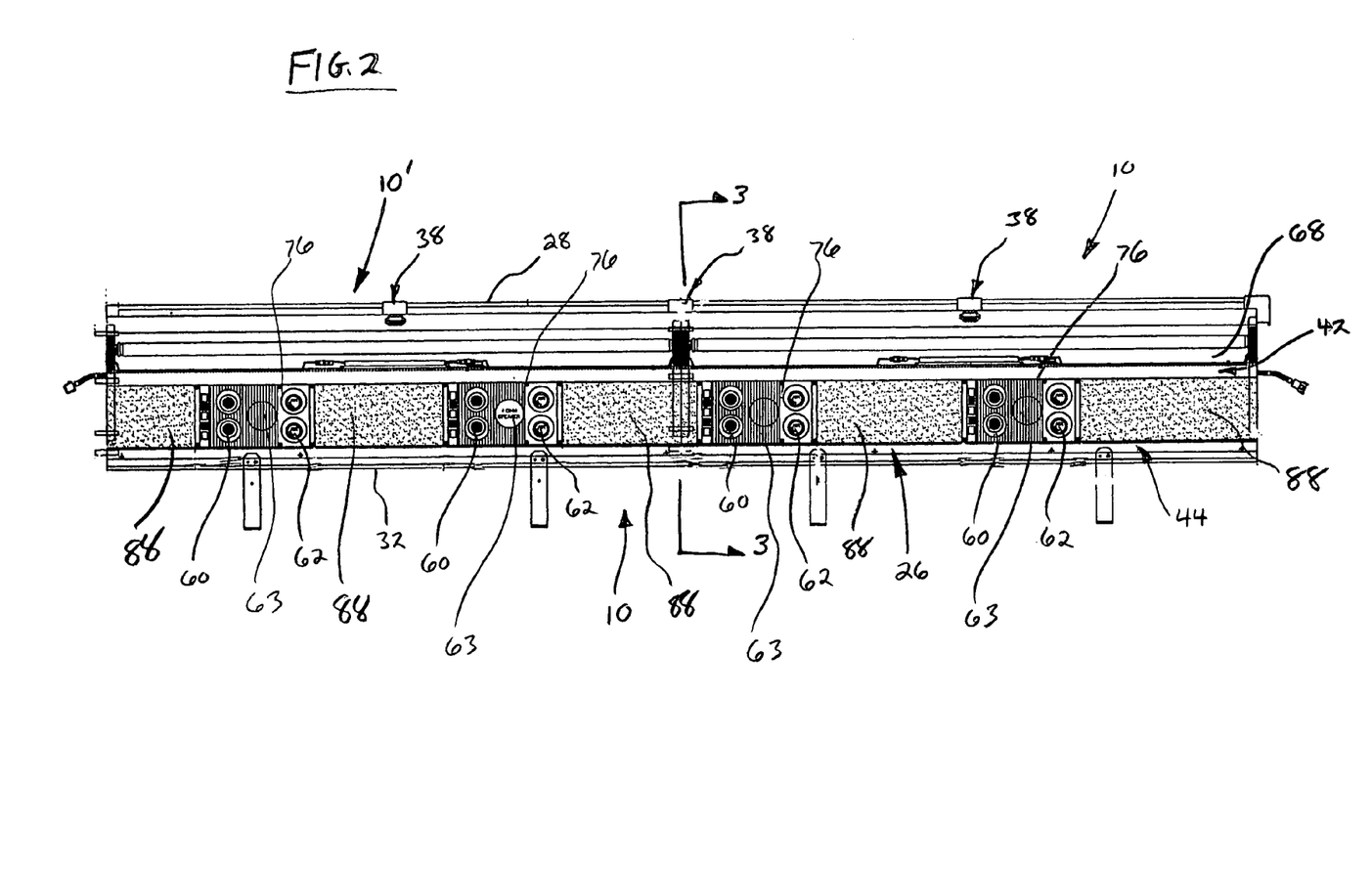
FIG. 2 is a bottom view of a luggage loft assembly constructed according to the invention.

As shown in FIGS. 2 and 3, the assembly 10 also includes an outer shell 26 spaced below the inner shell 12. The outer shell 26 has an inboard edge 28 connected to an inboard edge 30 of the inner shell 12 and an outboard edge 32 connectable to a supporting structure such as a vehicle passenger compartment wall 36 to support the outboard edge 32 of the outer shell 26.

As shown in FIG. 3 the outer shell 26 partially defines a longitudinal cavity 34 between the outer shell 26, the wall 36, and the ceiling 22 of the vehicle passenger compartment 24. At least a portion of the longitudinal cavity 34 is shaped to serve as an air duct or a portion of an air duct extending longitudinally along the vehicle 8.

The assembly 10 also includes at least two generally vertical stanchions shown at 38 in FIGS. 2 and 3. Each of the stanchions has a lower end connected to the inboard edge 28, 30 of at least one of the inner and outer shells 12, 26. The stanchions 38 also each have an upper end 40 connectable to a supporting structure such as the ceiling 22 of a vehicle passenger compartment 24. The stanchions 38 support the respective inboard edges 28, 30 of the inner and outer shells 12, 26 by suspending them from the ceiling 22.

The outer shell 26 is a composite structure comprising elongated inboard and outboard channels shown at 42 and 44, respectively, in FIGS. 2, 3, 6 and 7. As is best shown in FIG. 3, the inboard channel 42 has an outboard edge 46 that interconnects with an inboard edge 48 of the outboard channel 44. Each channel 42, 44 interconnects with the inner shell 12.

As shown in FIG. 3, the outer shell 26 is formed to include an accessory recess 56 for receiving an accessory module 58 such as the air vent module shown at 60 in FIG. 2, which directs air from the longitudinal cavity 34 into the passenger compartment 24; the lighting module shown at 62 in FIG. 2, which directs light into a seating area 64 of the passenger compartment; and the speaker module shown at 63 in FIG. 2, which propagates sound into the passenger compartment 24. In the embodiment shown in the drawings, the air vent module 60, lighting module 62, and speaker module 63 are included in a combination air vent/lighting/speaker module 66. The outer shell 26 also includes a second accessory recess, shown at 68 in FIGS. 2 and 3, shaped to receive an accessory module such as an elongated lamp housing 70.

The inner and outer shells 12, 26 each comprise pultruded glass resin and each have a generally uniform thicknesses of 2.286 mm, which is sufficiently rigid to support packages and other items that mass transit vehicle passengers will typically deposit on the shelf panel 14. The outboard channel 44 is interconnected with the inner shell 12 and is shaped to direct air from the longitudinal cavity 34 into the passenger compartment 24.

Figure 7:
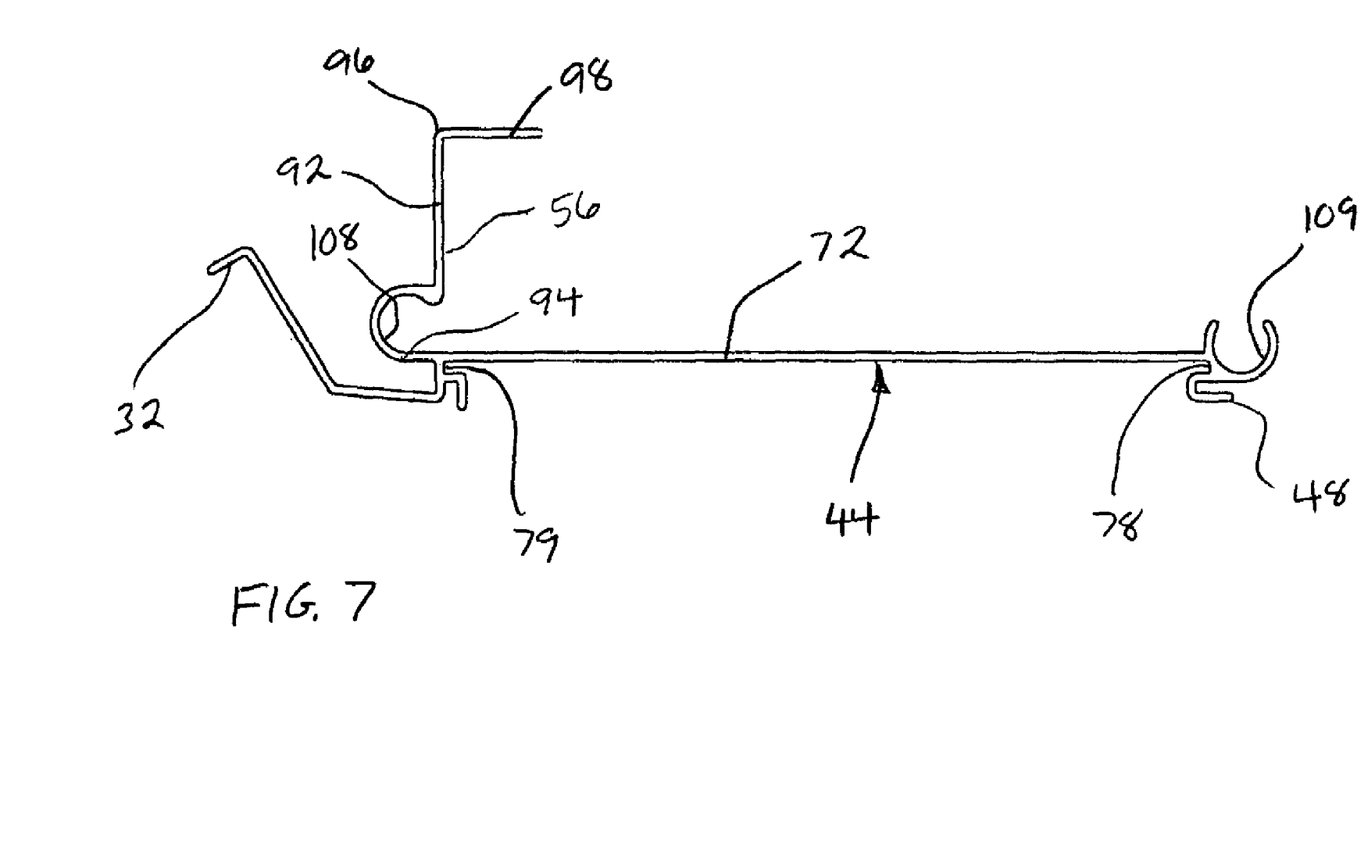
FIG. 7 is an end view of an outboard channel of the outer shell of the luggage loft assembly of FIG. 2.

The outboard channel 44 includes an elongated longitudinally oriented accessory mounting panel shown at 72 in FIGS. 3 and 7. As best shown in FIG. 3, the accessory mounting panel 72 is recessed into the outer surface of the outboard channel 44. The outboard channel 44 is of generally uniform cross section along its length except that the mounting panel 72 includes at least one accessory opening 74 configured to receive one or more of the accessory modules 58 that, as described above, include such accessories such as air exhaust vents, reading lamps, and speakers. The mounting panel 72 is recessed sufficiently to allow outer surfaces 76 of the accessory modules 58 to lie flush with an outer surface 52 of the inboard channel 42.

The outboard channel 44 includes a pair of elongated panel grooves 78, 79 formed along respective opposing inboard and outboard walls 80, 82 recessing the mounting panel 72. As is best shown in FIG. 2, the panel grooves 78, 79 are shaped and positioned to receive opposite edges of flexible trim panels 88 that fill spaces between accessory modules 58 along the outboard channel 44.

As shown in FIGS. 3 and 7, the outboard channel 44 includes an outboard wall 92 that extends integrally upward from an outboard edge 94 of the mounting panel 72. An upper edge of the outboard wall 92 includes an inward or inboard-directed bend 96 to form an outboard channel mounting flange 98 through which fasteners 100 are passed into an outboard-extending inner shell mounting flange 102 of the inner shell 12 to support the outboard channel 44 from the inner shell 12. An elongated abutment 104 extends integrally downward from the inner shell mounting flange 102 to help positively locate an inboard edge 106 of the outboard channel mounting flange 98. The inboard edge 48 of the outboard channel 44 interlocks with the inboard channel 42.

The outboard channel 44 includes two semi-cylindrical alignment pin receivers 108, 109 configured and positioned to receive pins 110 that align longitudinally adjacent channels 44 when the loft assembly 10 is installed in series along with other such assemblies 10' as shown in FIG. 2. The series of assemblies 10 may be installed in a cornice region 112 of a transit vehicle passenger compartment 24 as shown in FIG. 3. The two alignment pin receivers 108, 109 are disposed adjacent the inboard 48 and an outboard edge of the outboard channel 44 as best shown in FIG. 7.

The assembly 10 also includes an integrated wire harness holder 116 or conduit that doubles as an alignment pin and is shown in FIG. 3. The integrated wire harness holder 116 comprises a hollow steel tube shaped to receive insulated electrical wires 118 along its interior and having an external size and shape configured to fit within an alignment pin receiver 109. In the embodiment shown in FIG. 3, the wire harness holder 116 comprises a flexible ribbed conduit.

Figure 6:
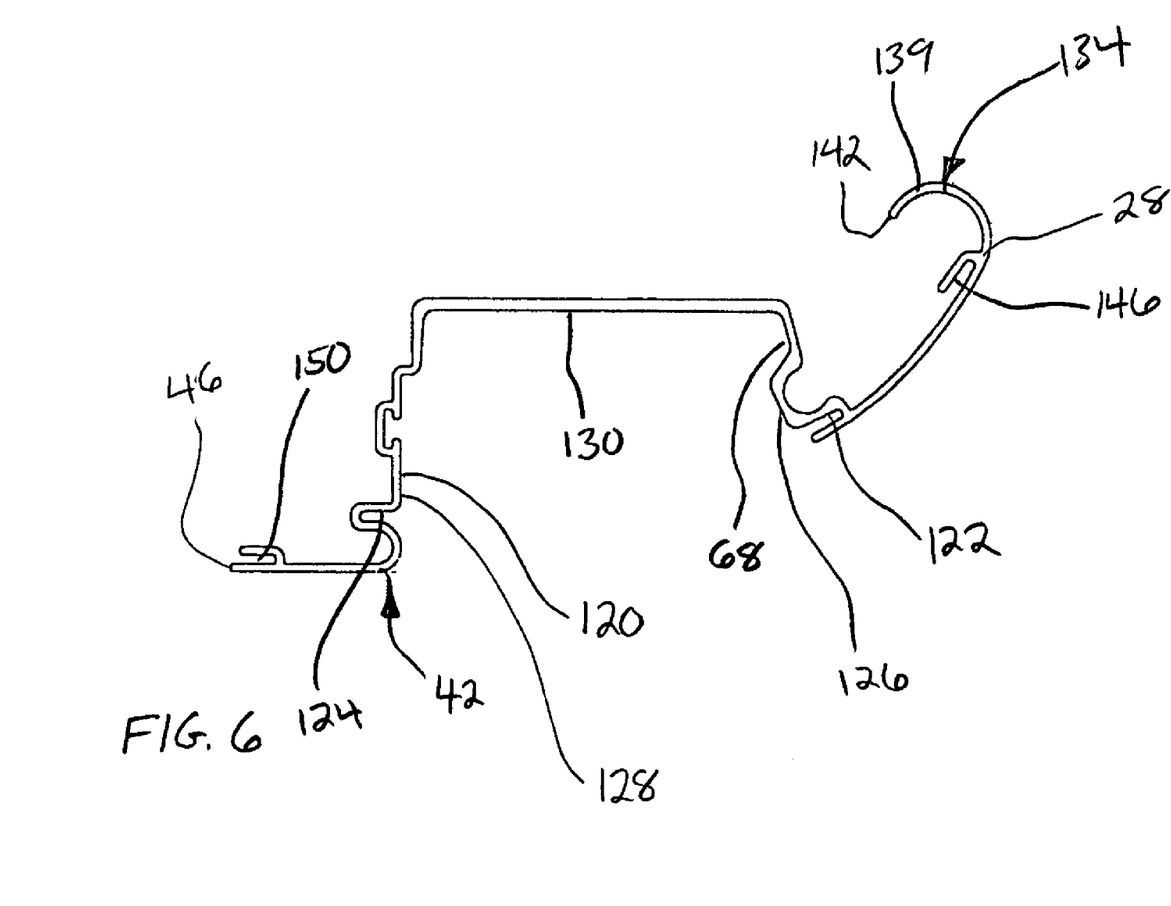
FIG. 6 is an end view of an inboard channel of an outer shell of the luggage loft assembly of FIG. 2.

As best shown in FIG. 6, the inboard channel 42 is, like the outboard channel 44, of generally uniform cross section along its length and includes an elongated longitudinal lamp recess 120 shaped to receive an interior lighting fixture such as the elongated lamp housing 70 discussed above and shown in FIG. 3. The lamp recess 120 of the inboard channel 42 includes a pair of elongated lens recesses 122, 124 formed along inboard and outboard walls 126, 128 of the lamp recess 120, respectively. The lens recesses 122, 124 are shaped to receive respective inboard and outboard edges of a flexible lens panel 129. An inner wall 130 of the lamp recess 120 is disposed flush against a lower surface 132 of the shelf panel 14 when the inboard channel 42 is attached to the inner shell 12.

The inboard channel 42 includes an integrated handrail 134 formed along an inboard upper edge of the inboard channel 42. The handrail 134 mechanically interlocks with lower ends 138 of the stanchions 38. As shown in FIG. 3, the handrail 134 includes an elongated arcuate detent 139 shaped to receive a complementary elongated arcuate groove 140 in the lower end 138 of each stanchion 38. The arcuate detent 139 of the handrail 134 and the arcuate groove 140 in the lower end 138 of each stanchion 38 are shaped and oriented to allow an assembler to slide each stanchion 38 onto and along the handrail 134 from one end of the handrail 134. The handrail 134 comprises an inboard edge of the inboard channel 42 that is curved outboard and has an approximate half-circular cross-section as best shown in FIG. 6. A distal inboard edge 142 of the arcuate detent 139 is spaced upward from the shelf panel 14.

The assembly 10 also includes at least one elongated generally rectangular spacer, shown at 144 in FIG. 3, shaped to fill the space between the handrail 134 and the shelf panel 14. The spacer 144 is held in position between the handrail 134 inboard edge and an upper surface of the shelf panel 14 by snap-fit engagement with a detent, shown at 146 in FIGS. 3 and 4, formed in the upper surface of the shelf panel 14.

The inboard channel 42 includes an inboard interconnect slot, shown at 148 in FIGS. 3 and 6. The inboard interconnect slot 148 is formed on an inner surface of the inboard channel 42 adjacent the inboard edge 28 of the inboard channel 42. The inboard interconnect slot 148 is shaped and positioned to receive the inboard edge 30 of the inner shell 12. Because the inboard edge 30 of the inner shell 12 is bent diagonally upward, the inboard interconnect slot 148 is disposed diagonally so that the inboard edge 30 of the inner shell 12 can be slid diagonally upward into the inboard interconnect slot 148.

The inboard channel 42 also includes an outboard interconnect slot 150 that, as best shown in FIG. 6, is formed in an outboard edge of the inboard channel 42. The outboard interconnect slot 150 is shaped and positioned to receive the inboard edge 48 of the outboard channel 44.

Figure 4:
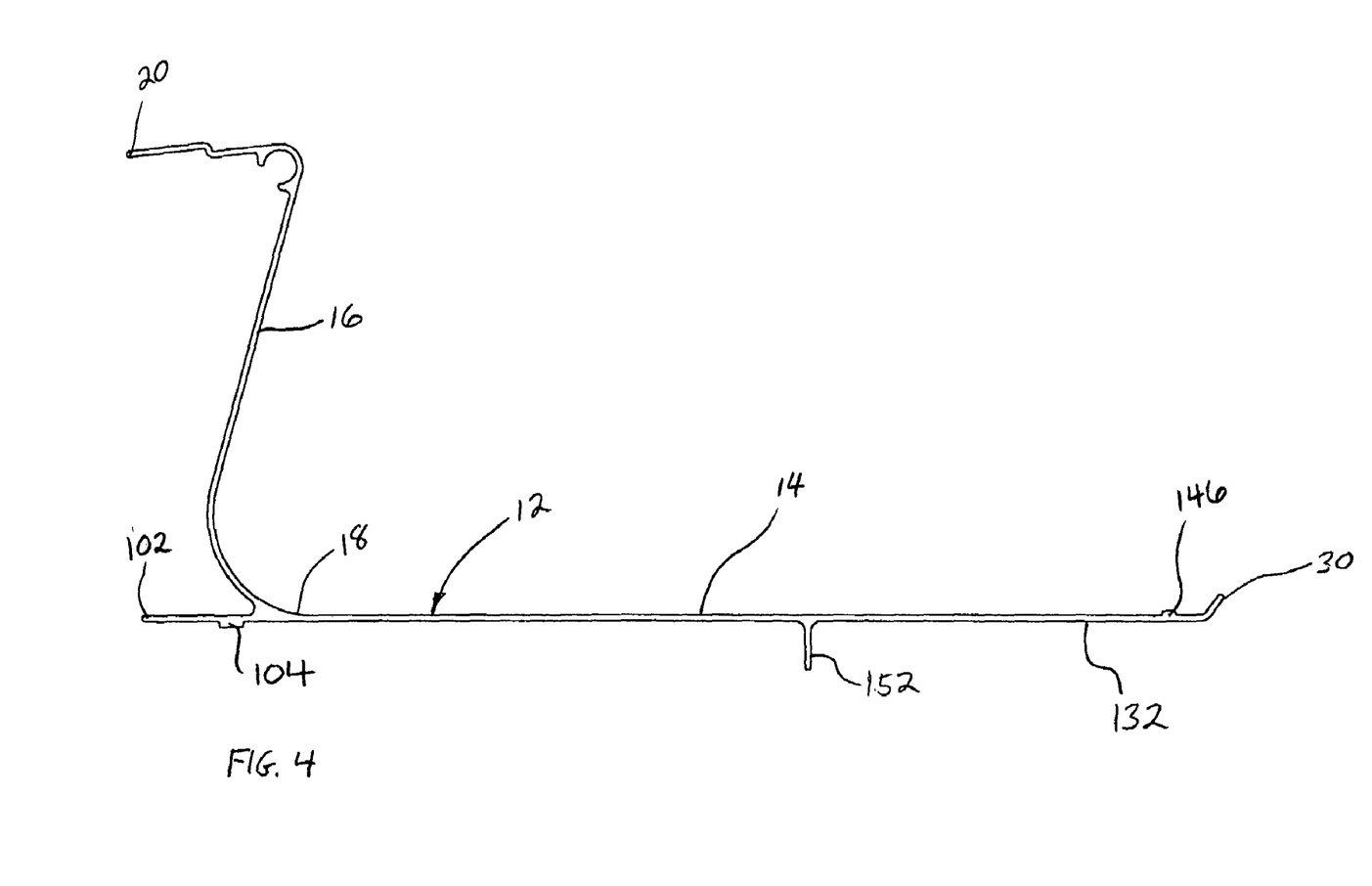
FIG. 4 is an end view of an inner shell of the luggage loft assembly of FIG. 2.
Figure 5:
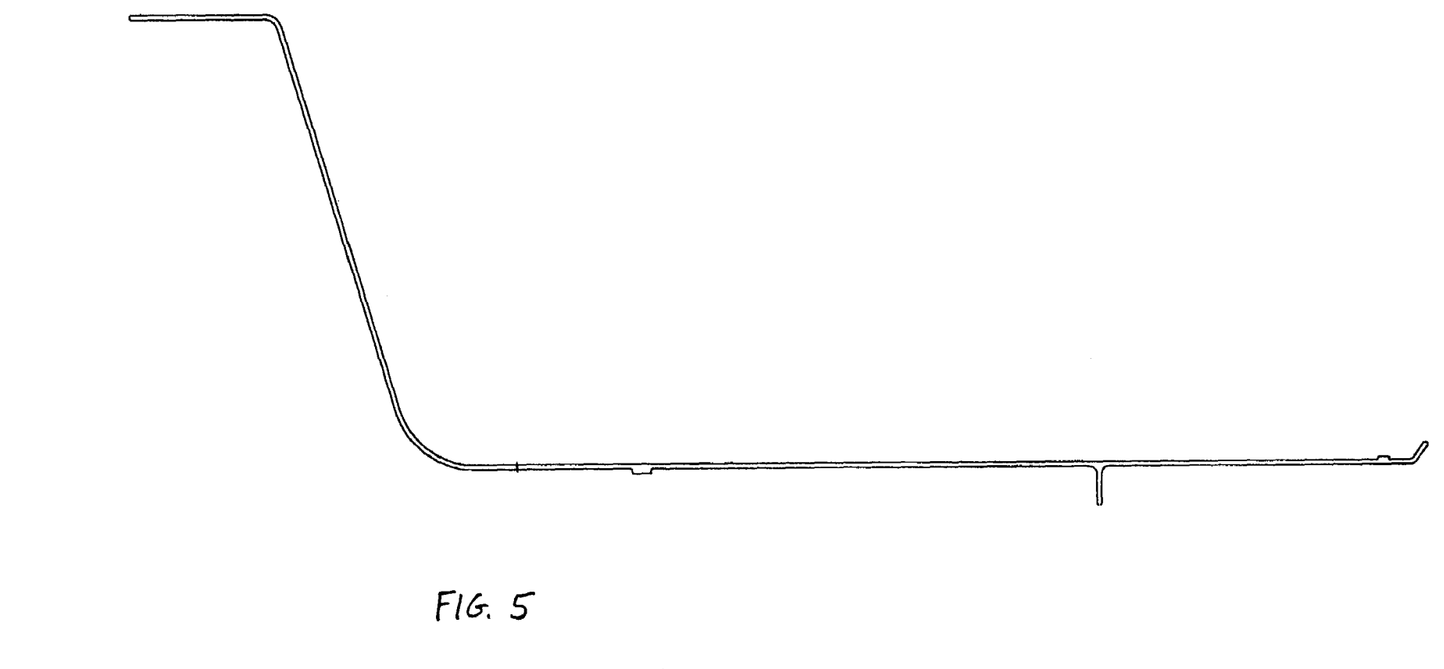
FIG. 5 is an end view of an alternative inner shell construction.

A longitudinal rib, shown at 152 in FIGS. 3 and 4, extends integrally downward from the shelf panel 14 in a position where the outboard wall 128 of the lamp recess 120 of the inboard channel 42 will abut the longitudinal rib 152 when the inboard channel 42 is positioned for attachment to the shelf panel 14.

Both the outboard channel 44 and the inboard channel 42 are pultruded as single unitary pieces from glass resin.

A flexible strap, shown at 154 in FIG. 3, is connected at a lower end to the outboard edge 32 of the outboard channel 44 and connects at an upper end to a supporting structure such as a vehicle ceiling 22. The outboard edge 32 of the outboard channel 44 is thus suspended in a position spaced from the vehicle wall 36.

A generally rectangular duct panel, shown at 156 in FIG. 3, is fastened along an inboard edge to the outboard edge 32 of the outboard channel 44 and is fastened along an outboard edge to a supporting structure such as a vehicle wall 36. The duct panel 156 is shaped to close the gap between the outboard edge 32 of the outboard channel 44 and a vehicle wall 36 and can be fabricated in whatever shape is required to suit a particular vehicle application.

The stanchions 38 comprise cast. aluminum cores 162 supporting vac-formed sleeves 164. The upper end 40 of each stanchion 38 is configured to mechanically interlock with a ceiling mount, shown at 166 in FIG. 3, which is pre-positioned and fastened to the ceiling 22 of a vehicle passenger compartment 24. An elongated aluminum male engagement rail 168 extends integrally upward from the upper end 40 of the cast aluminum core 162 of each stanchion 38 and has a generally T-shaped cross-section. The ceiling mount 166 is also made of aluminum and comprises an elongated female engagement channel 170 having a T-shaped cross-section complementing that of the elongated male engagement rails 168 of the stanchions 38. The elongated female engagement channel 170 is thus shaped to receive the male engagement rail 168 of each stanchion 38 in longitudinal sliding engagement.

According to the invention, a luggage loft assembly 10 can be made by interlocking the inner shell 12 with the inboard and outboard channels 42, 44 and fastening them in place using rivets. The inner shell 12 is interlocked with the inboard channel 42 by inserting the inboard edge 30 of the shelf panel 14 into the inboard interconnect slot 146 of the inboard channel 42. The inner wall 128 of the lamp recess 120 of the inboard channel 42 is then nested against the shelf panel 14 and the longitudinal rib 152. The inner shell 12 and inboard channel 42 are interlocked with the outboard channel 44 by inserting the inboard edge 48 of the outboard channel 44 into the outboard interconnect slot 150 of the inboard channel 42. The mounting flange 98 of the outboard channel 44 is then nested against the inner shell mounting flange 102 and the elongated integral abutment 104. Rivets are then installed through the outboard channel mounting flange 98 and the inner shell mounting flange 102.

The lower ends 138 of the stanchions 38 are then attached along the inboard channel 42 by sliding the stanchions 38 onto one end of the handrail 134 and along the handrail 134 to respective desired spaced-apart positions. Set screws are then installed through each stanchion 38 and into the inner shell 12. The spacer panels 144 are then installed in the handrail 134 between the stanchions 38.

The ceiling mount 166 is then attached to the upper ends 40 of the stanchions 38 by sliding the engagement channel 170 of the ceiling mount 166 over the engagement rails 168 that extend from the upper ends 40 of each of the stanchions 38.

The assembled luggage loft assembly 10 may then be installed in a mass transit vehicle passenger compartment 24 by attaching the ceiling mount 166 to a vehicle support structure such as a ceiling 22 after attaching the ceiling mount 166 to the stanchions 38. The outboard edge 32 of the outboard channel 44 is then attached to a support structure such as a wall 36 of the vehicle 8 and the upper edge 20 of the inner shell 12 back wall 16 is attached to a support structure such as a vehicle ceiling 22. To attach the upper edge 20 of the inner shell 12 back wall 16 to a vehicle ceiling 22, an installer reaches upward between the vehicle wall 36 and outboard edge 32 of the outboard channel 44 to gain access to the upper edge 20 of the inner shell 12 back wall 16, then passes fasteners through the inner shell 12 back wall 16 and into a support structure such as a vehicle ceiling 22. Doors may then be attached between the stanchions 38. The strap 154 is connected between the outboard edge 32 of the outboard channel 44 and the vehicle ceiling 22 or wall 36 and the duct extension panel 156 may then be installed between the outboard edge 32 of the outboard channel 44 and a wall 36 of a vehicle passenger compartment 24.

This description is intended to illustrate certain embodiments of the invention rather than to limit the invention. Therefore, it uses descriptive rather than limiting words. Obviously, it's possible to modify this invention from what the description teaches. One may practice the invention other than as described.

What is claimed is:

1. A luggage loft assembly for supporting articles for overhead storage in a mass transit vehicle, the assembly comprising:
    an inner shell including:
        a shelf panel supportable in a generally horizontal attitude and a longitudinal orientation in a cornice area of a mass transit vehicle, and
        a back wall that extends integrally upward from an outboard edge of the shelf panel to a back wall upper edge configured to connect to a supporting structure in a vehicle interior;
    an outer shell having an inboard edge connected to an inboard edge of the inner shell and having an outboard edge connectable to a supporting structure in a vehicle interior, the outer shell being configured to define a portion of a longitudinal cavity bounded by the outer shell, a wall, and a ceiling of a vehicle;
    at least two stanchions, each having a lower end connected to the inboard edge of at least one of the inner and outer shells and each having an upper end connectable to a supporting structure in a vehicle interior; and
    the outer shell comprises an elongated inboard channel connected to the stanchions and an elongated outboard channel connectable to a supporting structure in a vehicle interior, the inboard channel having an outboard edge connected to an inboard edge of the outboard channel.

2. A luggage loft assembly as defined in claim 1 in which each channel is connected to the inner shell.

3. A luggage loft assembly as defined in claim 1 in which the outer shell is configured to define a longitudinally extending air duct in the cornice area of a vehicle interior.

4. A luggage loft assembly as defined in claim 1 in which at least one of the channels is configured to house an accessory module.

5. A luggage loft assembly for supporting articles for overhead storage in a mass transit vehicle, the assembly comprising:
    an inner shell including:
        a shelf panel supportable in a generally horizontal attitude and a longitudinal orientation in a cornice area of a mass transit vehicle, and
        a back wall that extends integrally upward from an outboard edge of the shelf panel to a back wall upper edge configured to connect to a supporting structure in a vehicle interior;
    an outer shell having an inboard edge connected to an inboard edge of the inner shell and having an outboard edge connectable to a supporting structure in a vehicle interior, the outer shell being configured to define a portion of a longitudinal cavity bounded by the outer shell, a wall, and a ceiling of a vehicle;

at least two stanchions, each having a lower end connected to the inboard edge of at least one of the inner and outer shells and each having an upper end connectable to a supporting structure in a vehicle interior; and the inner and outer shells each comprise pultruded glass resin of sufficient thickness to obviate the need for ribs.

6. A luggage loft assembly as defined in claim 5 in which the inner and outer shells have generally uniform thicknesses of less than 3 mm.

7. A luggage loft assembly as defined in claim 5 in which: the outer shell includes a longitudinally oriented outboard channel interconnected with the inner shell and a longitudinally oriented inboard channel, and the outboard channel is configured to direct air laterally from the air duct into the passenger compartment.

8. A luggage loft assembly as defined in claim 7 in which the outboard channel includes an elongated longitudinally oriented accessory mounting panel recessed into an outer surface of the outboard channel.

9. A luggage loft assembly as defined in claim 5 in which the outboard channel includes an outboard wall that extends integrally upward from an outboard edge of the mounting panel to an upper edge connected to the inner shell.

10. A luggage loft assembly as defined in claim 7 in which an inboard edge of the outboard channel interlocks with the inboard channel.

11. A luggage loft assembly as defined in claim 10 in which the outboard channel includes at least one alignment pin receiver configured and positioned to receive a pin that aligns longitudinally adjacent channels when the loft assembly is installed in series along with other such assemblies along the cornice region of a transit vehicle passenger compartment.

12. A luggage loft assembly as defined in claim 11 in which the assembly includes an integrated wire harness holder comprising a tube configured to receive insulated electrical wires along its interior and having an external size and shape configured to fit within an alignment pin receiver such that the holder can serve double duty as an alignment pin.

13. A luggage loft assembly as defined in claim 7 in which the outboard channel is pultruded as a single unitary piece from glass resin.

14. A luggage loft assembly as defined in claim 7 in which the inboard channel is configured to receive an interior lighting fixture.

15. A luggage loft assembly as defined in claim 7 in which the inboard channel includes an integrated handrail formed along an inboard upper edge of the channel.

16. A luggage loft assembly as defined in claim 15 in which the handrail is configured to mechanically interlock with the lower ends of the stanchions.

17. A luggage loft assembly as defined in claim 16 in which the handrail includes an elongated arcuate detent configured to receive a complementary elongated arcuate groove in the lower end of each stanchion such that each stanchion can be slid onto and along the handrail from one end of the handrail during assembly.

18. A luggage loft assembly as defined in claim 5 in which the inboard channel includes an inboard interconnect slot formed on an inner surface of the channel adjacent the inboard edge of the channel and configured to receive an inboard edge of the shelf panel.

19. A luggage loft assembly as defined in claim 5 in which the inboard channel includes an outboard interconnect slot formed in an outboard edge of the channel and configured to receive the inboard edge of the outboard channel.

20. A luggage loft assembly as defined in claim 5 in which a longitudinal rib extends integrally downward from the shelf panel.

21. A luggage loft assembly as defined in claim 5 in which the inboard channel is pultruded as a single unitary piece from glass resin.

22. A luggage loft assembly as defined in claim 5 in which a strap is connected at a lower end to an outboard edge of the outboard channel and is connectable at an upper end to a supporting structure such as a vehicle ceiling.

23. A luggage loft assembly as defined in claim 5 in which: an outboard edge of the outboard channel is spaced from the vehicle wall and a duct panel is fastened along an inboard duct panel edge to the outboard edge of the outboard channel and is configured to be fastened along an outboard edge to a supporting structure such as a vehicle wall.

24. A luggage loft assembly as defined in claim 5 in which the upper end of each stanchion is configured to mechanically interlock with a ceiling mount prepositioned and supported on the ceiling of a vehicle passenger compartment.

25. A luggage loft assembly as defined in claim 24 in which the upper end of each stanchion includes an integral elongated male engagement rail having a generally T-shaped cross-section and the ceiling mount comprises an elongated female engagement channel having a T-shaped cross-section and configured to receive the male engagement rail of each stanchion in longitudinal sliding engagement.

26. A method for making a luggage loft assembly includes:

providing an inner shell that includes a shelf panel;

providing an outer shell configured to define a portion of a longitudinal cavity bounded by the outer shell and including an elongated inboard channel and an elongated outboard channel;

interlocking the inner shell with the inboard and outboard channels;

attaching lower ends of a pair of stanchions at spaced locations along the inboard channel;

attaching a ceiling mount to upper ends of the stanchions;

supporting the ceiling mount on a vehicle ceiling after attaching the ceiling mount to the stanchions; and supporting an outboard edge of the outboard channel on a wall of the vehicle.

27. The method of claim 26 in which: the step of providing an inner shell includes providing a back wall that extends integrally upward from an outboard edge of the shelf panel; and an upper edge of the inner shell back wall is attached to a support structure such as a vehicle ceiling following the step of attaching the lower ends of the stanchions.

28. The method of claim 27 in which the step of supporting the outboard edge of the outboard channel on a wall of the vehicle includes reaching upward between the vehicle wall and the outboard edge of the outboard channel to gain access to the upper edge of the inner shell back wall.

29. The method of claim 26 in which the step of interlocking the inner shell with the inboard and outboard channels includes inserting an inboard edge of the shelf panel into an inboard interconnect slot formed on an inner surface of the channel adjacent the inboard edge of the channel.

30. The method of claim 26 in which the step of interlocking the inner shell with the inboard and outboard channels includes inserting an inboard edge of the outboard channel into an outboard interconnect slot formed in an outboard edge of the channel.

31. The method of claim 26 in which the step of attaching the lower ends of the stanchions along the inboard channel includes sliding the stanchions onto one end of a handrail formed along an inboard upper edge of the channel and sliding the stanchions along the handrail to respective desired spaced-apart positions.

32. The method of claim 26 in which the step of attaching the ceiling mount to the upper ends of the stanchions includes sliding an engagement channel of the ceiling mount over engagement rails extending from the upper ends of each of the stanchions.

33. The method of claim 26 including the additional step of installing a duct extension panel between the outboard edge of the outboard channel and a wall of a vehicle passenger compartment.

* * * * *